(12) United States Patent
Burak et al.

(10) Patent No.: US 10,989,101 B2
(45) Date of Patent: Apr. 27, 2021

(54) COOLANT DELIVERY DEVICE FOR A COOLING SYSTEM OF AN INTERNAL COMBUSTION ENGINE, IN PARTICULAR OF A MOTOR VEHICLE, COOLING SYSTEM, AND INTERNAL COMBUSTION ENGINE

(71) Applicant: Robert Bosch GmbH, Stuttgart (DE)

(72) Inventors: Ingmar Burak, Stuttgart (DE); Peter Schenk, Ludwigsburg (DE); Simon Obergfaell, Waiblingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/418,392

(22) Filed: May 21, 2019

(65) Prior Publication Data

US 2019/0360381 A1 Nov. 28, 2019

(30) Foreign Application Priority Data

May 22, 2018 (DE) ..................... 10 2018 208 001.1

(51) Int. Cl.
*F01P 9/02* (2006.01)
*F01P 5/12* (2006.01)
*F01P 3/12* (2006.01)

(52) U.S. Cl.
CPC ........ *F01P 9/02* (2013.01); *F01P 3/12* (2013.01); *F01P 5/12* (2013.01)

(58) Field of Classification Search
CPC .............. F01P 9/02; F01P 3/12; F01P 5/12
See application file for complete search history.

(56) References Cited

U.S. PATENT DOCUMENTS

| 6,065,452 A * | 5/2000 | Yoshioka ............. B60K 15/077 123/509 |
| 2010/0229532 A1* | 9/2010 | Ohno ...................... F02D 29/02 60/274 |
| 2012/0315196 A1* | 12/2012 | Maus .................... F01N 3/2066 422/174 |

FOREIGN PATENT DOCUMENTS

| DE | 10 2008 010 105 A1 | 8/2009 |
| DE | 10 2015 205 499 A1 | 9/2016 |
| DE | 10 2016 203 056 A1 | 8/2017 |
| DE | 10 2017 210 487 A1 | 12/2018 |
| EP | 3 324 031 A1 | 5/2018 |
| WO | 2011/085830 A1 | 7/2011 |
| WO | 2016/177556 A1 | 11/2016 |
| WO | 2018/050895 A1 | 3/2018 |

* cited by examiner

*Primary Examiner* — Kevin A Lathers
(74) *Attorney, Agent, or Firm* — Maginot, Moore & Beck LLP

(57) ABSTRACT

A coolant delivery device for an internal combustion engine, in particular for a motor vehicle, includes a pump, a an activatable electric motor, a shut-off valve, a return line, a heating device, and a common module housing. The pump is configured to deliver liquid coolant, and includes a suction port configured to connect to a tank, and a pressure port for the coolant and which is assigned to the engine. The motor is configured to drive the pump. The valve is assigned to the suction port. The return line is configured to connect to the tank, and includes at least one check valve. At least the pump, motor, valve, heating device, and the at least one check valve together form a delivery module and are positioned in the common module housing.

15 Claims, 3 Drawing Sheets

COOLANT DELIVERY DEVICE FOR A COOLING SYSTEM OF AN INTERNAL COMBUSTION ENGINE, IN PARTICULAR OF A MOTOR VEHICLE, COOLING SYSTEM, AND INTERNAL COMBUSTION ENGINE

This application claims priority under 35 U.S.C. § 119 to patent application no. DE 10 2018 208 001.1, filed on May 22, 2018 in Germany, the disclosure of which is incorporated herein by reference in its entirety.

The disclosure relates to a coolant delivery device for an internal combustion engine, in particular of a motor vehicle, having a pump for delivering a liquid coolant, which pump has a suction port connectable to a tank and has a pressure port, which is assignable to the internal combustion engine, for the coolant, having an activatable electric motor for driving the pump, having a shut-off valve which is assigned to the suction port, having a return line which is connectable to the tank and which has at least one check valve, and having a heating device.

The disclosure furthermore relates to a cooling system having a coolant delivery device of said type, and to an internal combustion engine having a cooling system of said type.

BACKGROUND

Coolant delivery devices of the type mentioned in the introduction are already known from the prior art. Owing to increasing demands on exhaust-gas emissions, internal combustion engines are increasingly being optimized with regard to their consumption. For this purpose, firstly, the compression of the air masses introduced into the cylinders of the internal combustion engine is increased. Such internal combustion engines however cannot be operated with optimum operating characteristics, in particular with optimum consumption, at operating points with high load, because the operating point is limited by the knocking tendency of the internal combustion engine and the high exhaust-gas temperatures that are generated. To reduce the knocking tendency, it is known for ignition times to be retarded, wherein, however, for the same demanded power, the fuel consumption increases. To reduce the exhaust-gas temperatures, it is known for the air-fuel mixture to be enriched with additional fuel, as a result of which the fuel consumption is however likewise increased.

A further possible measure for reducing the knocking tendency and for lowering the exhaust-gas temperatures is the injection of liquid coolant, in particular water, either directly into the combustion chambers of the internal combustion engine or into the intake tract thereof. For this purpose, coolant systems are known which store a liquid coolant, in particular water, in a tank and convey it by means of a coolant delivery device to an actuatable injection valve in order to inject the desired quantity of coolant or water. A coolant delivery device that is required for this purpose commonly has a pump, an electric motor which drives the pump, a shut-off valve which is assigned to a suction line of the pump, and a heating device. The heating device serves for thawing frozen coolant or water that is present in the system in order to ensure fast operational readiness of the system after a start of the internal combustion engine even in the presence of ambient temperatures below the freezing point of the coolant, and to protect the system against damage owing to icing of the liquid-conducting components. Pressure control of the system is achieved by means of a return line which is fluidically connected to the tank. By means of the heating device, it is possible for remaining coolant liquid to be heated and melted as required in order to achieve that the coolant is made available quickly and/or icing damage is prevented.

SUMMARY

The coolant delivery device according to the disclosure has the advantage that the coolant delivery device can be designed to be particularly compact, robust and advantageously thawable. By virtue of the fact that the main components of the coolant delivery device are arranged in a common module housing, it is achieved that the main elements can be thawed as required by means of the at least one heating device such that high efficiency of the heating device with regard to the coolant delivery device is ensured. The improved efficiency is highly advantageous in terms of the coolant injection because, owing to the high melting enthalpy and high specific heat capacity, in particular of water, a large amount of energy must be expended in order to reliably thaw the individual components of the coolant delivery device. A further advantage of the design as a delivery module with a common or single module housing arises as a result of the short hydraulic line length between the individual components, in particular of the return line. It is thus achieved that the back-suction process for emptying the lines or for freeing the lines of coolant can be performed in a short time, and less residual water has to be thawed as required, which yields a further energy advantage. The design as a delivery module furthermore results in simple and fast installation by the end customer, which furthermore eliminates the possibility of an incorrect assembly sequence of the individual components. Here, at least the pump, the electric motor, the shut-off valve, the check valve and the heating device are understood to be main components of the coolant delivery device. The coolant delivery device is designed in particular as a water delivery device.

In a preferred refinement of the disclosure, in the module housing, there are arranged at least one first filter assigned to the suction port and/or at least one second filter assigned to the pressure port. By means of the arrangement of the one or of the two filter(s) in the module housing, it is achieved that these, too, can be efficiently heated as required by means of the heating device, and thus residual water/liquid remaining in the respective filter can be thawed.

Provision is furthermore preferably made whereby, in the module housing, there is arranged at least one pressure sensor assigned in particular to the pressure port. By means of the pressure sensor, a functional check of the coolant delivery device at any time is ensured. Also, the delivery pressure and/or the delivery volume can be regulated by means of the pressure sensor. By means of the advantageous arrangement of the pressure sensor in the module housing, it is achieved that the pressure sensor can also be easily thawed by means of the heating device as required.

In a preferred refinement of the disclosure, in the module housing, there is arranged at least one pressure damper assigned in particular to the pressure port. The pressure damper is designed for example as a gas pressure damper and/or spring pressure damper, wherein the spring force may also be realized for example by means of flexible materials, such as rubber or the like. By means of the pressure damper, pressure oscillations of the pump are reduced, which is advantageous in particular if the pump is a positive-displacement pump, in particular piston pump. In this way, higher control quality of the pressure control and thus improved metering accuracy of the coolant during the injection is ensured. Additionally, the pressure damper offers the advantage that freezing coolant present in the system can expand into the pressure damper without components arranged in the module housing, or the module housing, being damaged as a result of the expansion. The pressure damper thus also contributes to protecting the coolant system against freezing coolant or water.

In a preferred refinement of the disclosure, the pressure sensor is positioned downstream of the second filter. This means that the second filter is situated between the pump and pressure sensor. In particular, the second filter is situated between the pressure sensor and the return line, which is connected to the pressure port. In particular, the second filter is designed as a fine filter. A fine filter is to be understood in particular to mean a filter which has a smaller mesh width than the first filter. If the second filter is not arranged in the module housing, then it is preferably arranged close to the internal combustion engine, in particular close to a coolant distribution rail, and is in particular of exchangeable design. In this case, heating of the fine filter is then realized in particular by means of the waste heat of the internal combustion engine.

In a preferred refinement of the disclosure, the heating device is designed as an electrically operable or as a hydraulic heating device. By means of the design as an electric heating device, the latter is activatable at any time and can be controlled easily and precisely in terms of its power. By means of the design as a hydraulic heating device, the expenditure of energy is reduced, for example because, as hydraulic heating medium, use can be made of cooling water originating from the internal combustion engine and heated by the internal combustion engine.

In a preferred refinement of the disclosure, the electric motor has at least one coil or rotor winding or stator winding which is operable as a heating device. In this case, the heating device is also designed as an electrically operable heating device and is integrated into the electric motor. Thus, by means of the activation of the at least one coil, it can be achieved that the electric motor radiates heat even without driving the pump.

Furthermore, provision is preferably made whereby the module housing is designed as a plastics housing. In this way, the module housing has a low weight and can be easily and inexpensively adapted to different space contours.

Preferably, in this case, the heating device has at least one heat-conducting element which is encompassed at least in certain portions by the module housing. By means of the heat-conducting element, which is manufactured in particular from a metal, it is ensured that the heat provided by the heating device is transported into extensive regions of the delivery module in order to ensure thawing of remaining liquid in the delivery module. In particular, the heat-conducting element is shaped and/or formed so as to extend to the liquid-conducting lines of the delivery module and thus feeds the provided heat directly to these. The electrically operable heating device is for example a metal part, for example sheet-metal, injection molded or cut part connected to an electric heating element or else a special plastic which heats up when an electrical voltage is applied or as a result of an electrical current flow.

In an alternative embodiment of the disclosure, the module housing is preferably manufactured from metal. In this way, the module housing itself offers advantageous heat conduction. In particular, here, the heating device is arranged directly on the module housing in order to ensure an advantageous heat transfer from the heating device into the module housing.

Provision is furthermore preferably made whereby the module housing has a heat-insulating shell. By means of this, the efficiency of the heating device in the delivery module is further increased, and furthermore, premature icing of the delivery module is prevented.

The cooling system according to the disclosure is distinguished by the coolant delivery device designed according to the disclosure. This yields the advantages already stated above.

The internal combustion engine according to the disclosure is distinguished by the coolant system according to the disclosure. This, too, yields the advantages already stated above. In particular, the coolant system is designed as a water injection system for the internal combustion engine.

BRIEF DESCRIPTION OF THE DRAWINGS

Further advantages and preferred feature combinations will emerge in particular from that which has been described above and from the claims. The disclosure will be discussed in more detail below on the basis of the drawing, in which:

DETAILED DESCRIPTION

Figure 1:
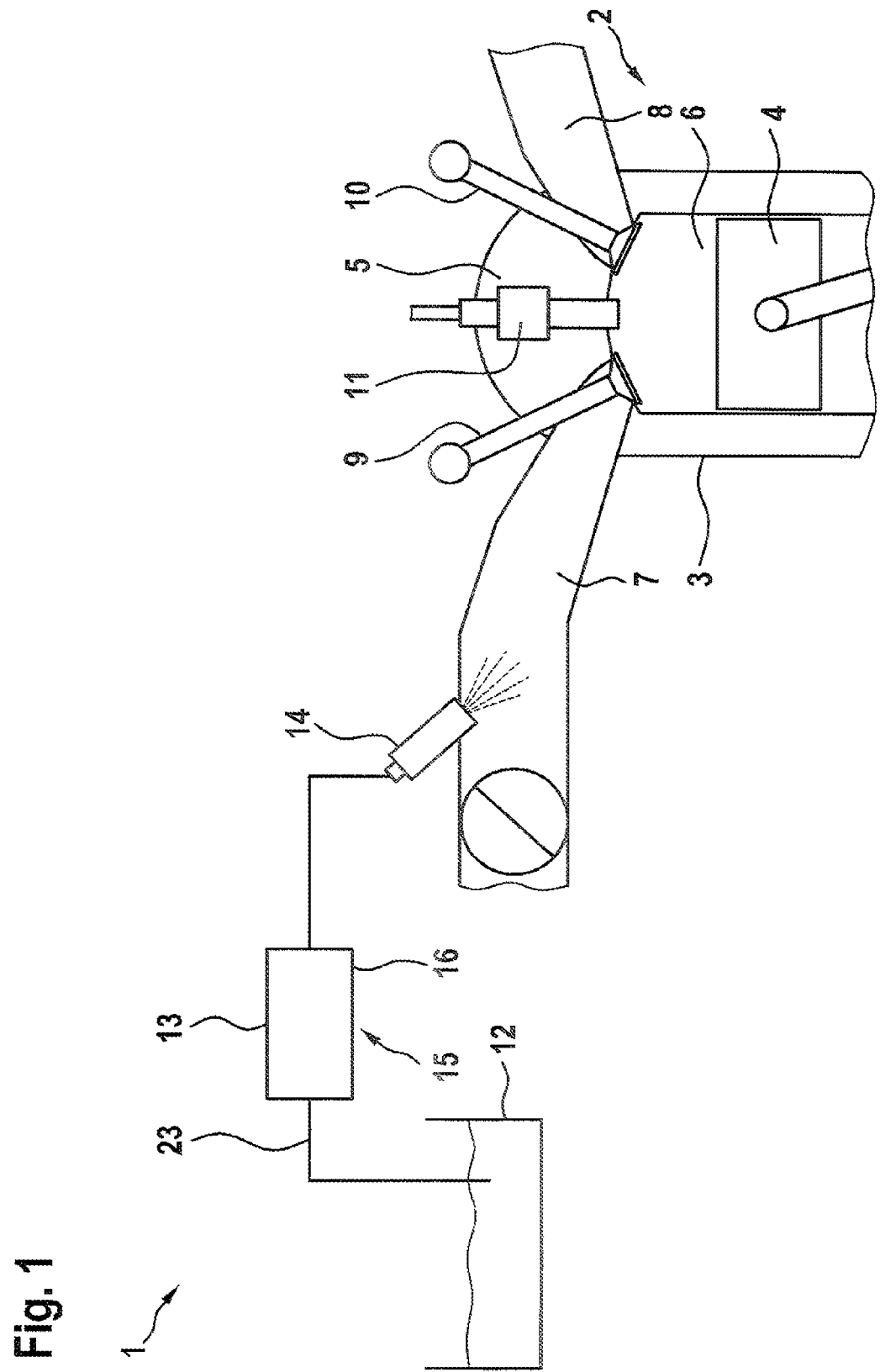
FIG. 1 shows an advantageous coolant system for an internal combustion engine.

FIG. 1 shows, in a simplified illustration, an advantageous coolant system 1 of an internal combustion engine 2. The internal combustion engine 2 is designed in particular as a reciprocating-piston engine and, in this regard, has multiple cylinders 3 in which in each case one piston 4 coupled to a crankshaft is mounted in longitudinally displaceable fashion. The piston 4 encloses, together with the cylinders 3 and a cylinder head 5, a combustion chamber 6 into which an intake pipe 7 and an exhaust pipe 8 open out. The intake pipe 7 and the exhaust pipe 8 are assigned an actuatable inlet valve 9 and outlet valve 10 respectively. Furthermore, on the cylinder head 5, there is arranged injection valve 11 which is designed to inject liquid fuel into the combustion chamber 6, such that said fuel, together with fresh air originating from the intake pipe 7, ignites in the combustion chamber 6 and thus performs work on the piston 4.

The coolant system 1 is designed as a water-injection system which has a tank 12 for providing and storing water, a coolant delivery device 13, and an injection valve 14. The coolant delivery device 13 is designed to deliver the water from the tank 12 to the injection valve 14, wherein the injection valve 14 is designed to inject the water into the intake pipe 7 of the internal combustion engine 2 in dosed fashion, such that the exhaust gas temperature and the knocking tendency of the internal combustion engine 2 are reduced. As an alternative to the illustrated exemplary embodiment, the injection valve 14 may be assigned directly to the cylinder 3 in order to inject the water directly into the combustion chamber 6.

In the present case, the coolant delivery device 13 is designed as a delivery module 15 which bears all the essential elements of the coolant delivery device 13 in a module housing 16.

Figure 2:
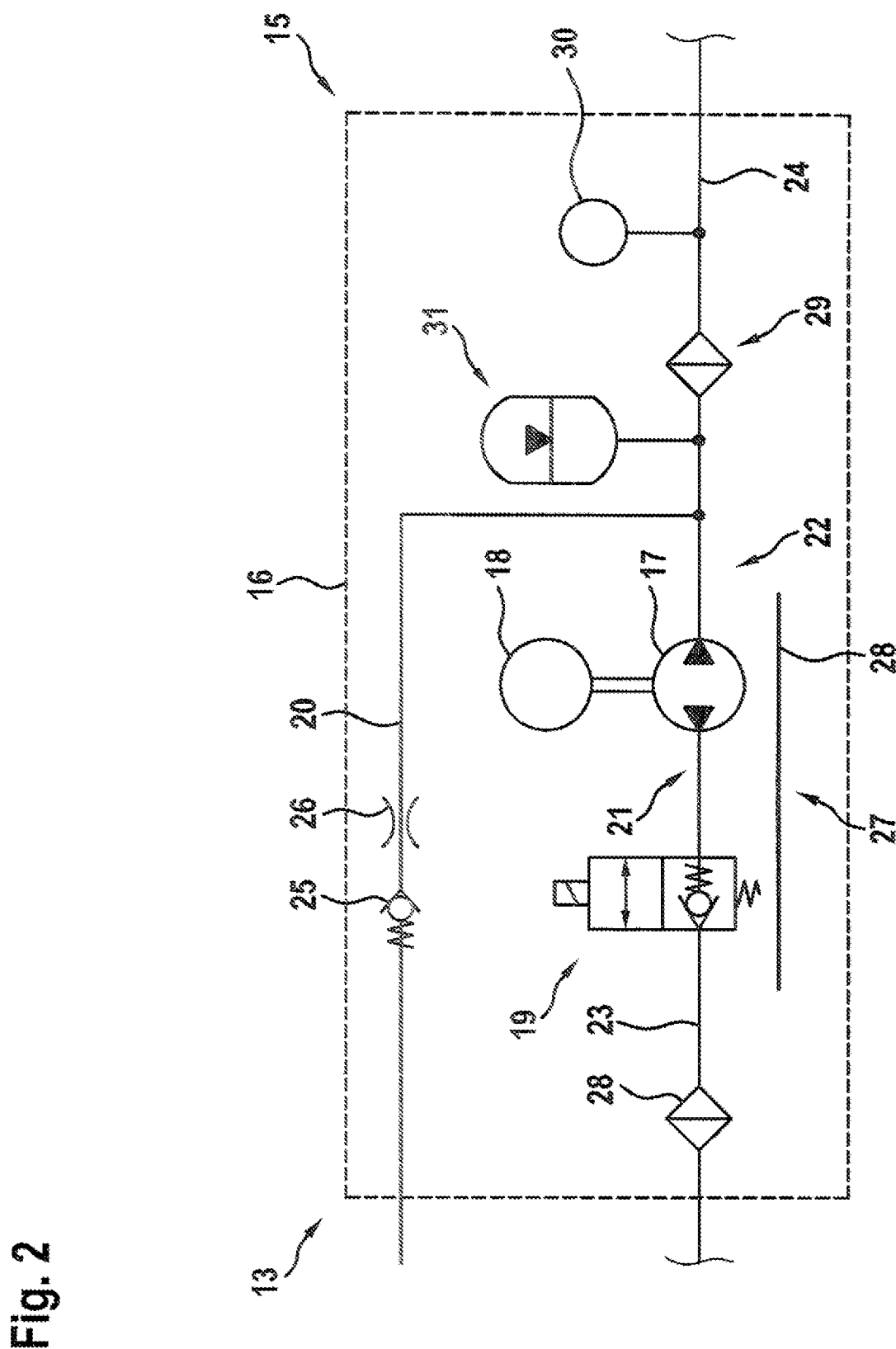
FIG. 2 shows a coolant delivery device of the coolant system in a simplified detail view.

In this regard, FIG. 2 shows, in a simplified illustration, the delivery module 15 with the module housing 16 (shown by dashed lines). The coolant delivery device 13 has, as main elements, a pump 17 for delivering the liquid coolant, an electric motor 18 for driving the pump 17, an activatable shut-off valve 19, and a return line 20. The pump 17 has a suction port 21 and a pressure port 22. The suction port 21 has an intake line 23, which leads to a tank 12. The pressure port 22 has a pressure line 24, which leads to the injection valve 14. Assigned to the pressure port 22 is the return line 20, which branches off from the pressure line 24 downstream of the pump 17 (if the pump 17 delivers in the direction of the injection valve 14). The return line 20 furthermore has a check valve 25 which prevents liquid from passing from the tank 12 through the return line 20 into the pressure line 24. A dosing aperture 26 is optionally also provided in the return line 20.

The return line 20, the pressure line 24 and the suction line 23 lead out of the module housing 16. Furthermore, electrical connection lines at least of the motor 18 and of the isolating valve 19 lead out of the housing in order for these to be externally activatable.

A heating device 27 is also arranged in the module housing 16. In the present exemplary embodiment, the heating device 27 is designed as an electrically operable heating device which, by electrical energization, generates heat and radiates said heat into the module housing 16. The module housing 16 is advantageously manufactured from plastic. In this way, the module housing 16 is of lightweight and robust design and is easily adaptable to different structural spaces. In this case, the heating device 27 advantageously has at least one heat-conducting element 28, in particular heat-conducting plate, which extends in the module housing 16 and which is in particular encompassed at least in certain portions by the module housing 16 for the mounting thereof. In particular, the heat-conducting element 28 is designed so as to extend to the main components of the coolant delivery device 13, such as the shut-off valve 19, the pump 17 and the check valve 25, such that these can be thawed, and thus possibly freed from ice, in a short time when required. By virtue of these components being combined in the delivery module 15, the heating device 27 can be utilized jointly, such that these components can be heated jointly. In this way, in the presence of temperatures below the freezing point, frozen coolant that has remained in the fluid-conducting lines of the coolant system 1 in particular after a back-suction process in the direction of the tank can be thawed. This is advantageous in particular for the return line 20 with the check valve 25 and the dosing aperture 26, because these normally cannot be back-suctioned.

By means of the delivery module 15, a compact arrangement of these components is possible, and furthermore, the number of external hydraulic and electrical points is reduced to a minimum. As an alternative to the design composed of plastic, the module housing 16 may also be manufactured from metal, for example iron, high-grade steel or aluminum, in order to improve the heat conductivity thereof.

In the module housing 16, there are optionally also arranged a first filter 28, which is situated in the suction line 23, and/or a second filter 29, which is situated in the pressure line 24 downstream of the branching point or mouth of the return line 20. In particular, the filter 28 is designed as a pre-filter and the second filter 29 is designed as a fine filter. Furthermore, at least one pressure sensor 30 is optionally arranged in the module housing 16. In the present case, the pressure sensor 30 is assigned to the pressure line 24 downstream of the second filter 29, that is to say is situated between the filter 29 and internal combustion engine 2, in order to monitor the delivery pressure of the pump 17 and ensure advantageous pressure control such that, in particular, the metering accuracy of the coolant or water into the fresh air or into the internal combustion engine 2 is ensured with high accuracy.

Alternatively, the first filter 28 is arranged in the tank 12, whereby the delivery module 15 can be designed to be more compact. In a further exemplary embodiment, the second filter 29 is arranged not in the delivery module 15 but in close-coupled fashion close to the internal combustion engine 2, in particular to a coolant distributing rail, and is in particular designed so as to be exchangeable. Heating or thawing of the fine filter is in this case realized in particular by means of the waste heat of the internal combustion engine 2.

A pressure damper 31 is furthermore optionally arranged in the module housing 16. Said pressure damper is then preferably connected to the pressure line 24 between the second filter 29 and the mouth of the return line 20. The pressure damper 31 may be realized for example through the use of flexible materials, such as rubber, and/or a gas-filled chamber and/or a spring. In this way, in embodiments of the pump 17 as a positive-displacement pump, pressure oscillations are reduced, which results in improved control quality of the pressure control, which in turn offers advantages with regard to the metering accuracy of the cooling liquid.

If the pressure sensor 30 is not present in the delivery module 15, then it is preferably attached, in close-coupled fashion, to the rail, in particular downstream of the fine filter, in order to compensate for a possible pressure drop across the fine filter during the pressure control.

The heating device 27 may be realized either by means of an additional heating wire or alternatively by means of the electrical energization of at least one coil or copper winding of the electric motor 18, or by means of a combination.

If the heating device 27 is designed as a hydraulic heating means, then in particular warm engine cooling water is conducted through said heating device and through a hydraulic conducting system within the delivery module 15. The cooling water flow is preferably the flow or partial flow of the motor vehicle conducted back from the interior compartment heating means.

Figure 3:
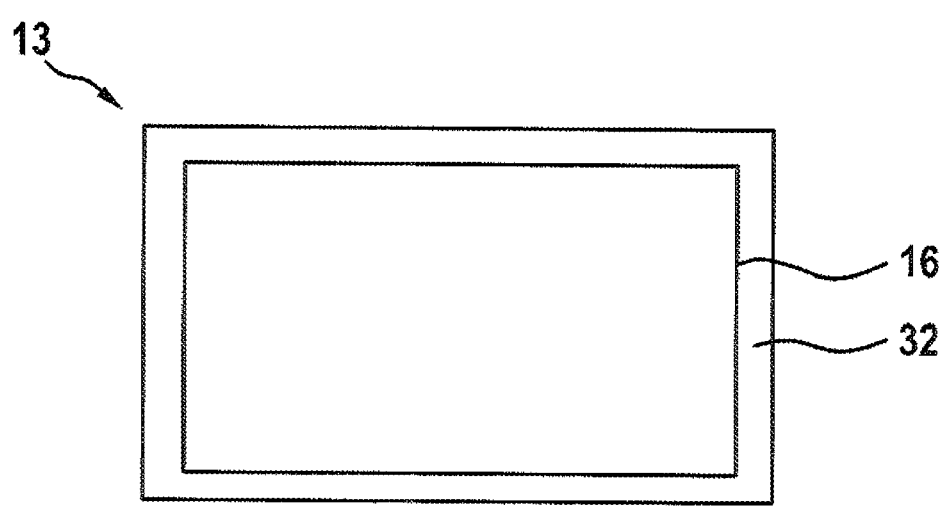
FIG. 3 shows the coolant delivery device according to an advantageous refinement in a further schematic illustration.

FIG. 3 shows an advantageous refinement of the delivery module 15, in the case of which the module housing 16 is equipped with a heat-insulating shell 32. This may be formed for example from polystyrene hard foam. In this way, in particular, the efficiency of the heating device 27 in the delivery module 15 is increased.

The check valve 25 may be designed in a variety of ways. In a first exemplary embodiment, it has a low opening pressure of less than 100 mbar, such that it only prevents water from being drawn out of the tank 12 during the back-suctioned process. Alternatively, the check valve is designed with an opening pressure in the range from 2 to 4 bar, which satisfies the additional function of "pressure holding". By means of this pressure holding, it is firstly prevented that liquid or water in the injection valve 14 does not boil at temperatures of up to 120° C., and secondly, it is prevented that air is forced back through the injection valve 14 into the cooling system 1 owing to charge pressure prevailing in the intake pipe 7.

What is claimed is:

1. A coolant delivery device for an internal combustion engine, comprising:
   a pump configured to deliver a liquid coolant, the pump including:

a suction port configured to connect to a tank; and
a pressure port configured to be assigned to the internal combustion engine for the coolant;
an activatable electric motor configured to drive the pump;
a shut-off valve assigned to the suction port;
a return line configured to connect to the tank, the return line including at least one check valve;
a heating device; and
a common module housing;
wherein, to form the coolant delivery device, at least the pump, the electric motor, the shut-off valve, the at least one check valve, and the heating device together form a delivery module and are positioned in the common module housing.

2. The coolant delivery device of claim 1, further comprising one or more of:
at least one first filter positioned in the common module housing and assigned to the suction port; and
at least one second filter positioned in the common module housing and assigned to the pressure port.

3. The coolant delivery device of claim 1, further comprising:
at least one pressure sensor positioned in the common module housing and assigned to the pressure port.

4. The coolant delivery device of claim 3, further comprising:
at least one second filter positioned in the common module housing and assigned to the pressure port;
wherein the at least one pressure sensor is positioned downstream of the at least one second filter.

5. The coolant delivery device of claim 1, further comprising:
a pressure damper positioned in the common module housing and assigned to the pressure port.

6. The coolant delivery device of claim 1, further comprising:
at least one second filter positioned in the common module housing and assigned to the pressure port;
wherein the second filter is positioned downstream of the return line.

7. The coolant delivery device of claim 1, wherein the heating device is either an electrically operable heating device or is a hydraulic heating device.

8. The coolant delivery device of claim 1, wherein the electric motor includes at least one coil that is operable as the heating device.

9. The coolant delivery device of claim 1, wherein the common module housing is formed from plastic.

10. The coolant delivery device of claim 1, wherein the heating device includes at least one heat-conducting element that is encompassed, at least in part, by the common module housing.

11. The coolant delivery device of claim 1, wherein the common module housing is formed from metal.

12. The coolant delivery device of claim 1, wherein the common module housing includes a heat-insulating shell.

13. The coolant delivery device of claim 1, wherein the coolant delivery device is a water delivery device for a water injection system of the internal combustion engine.

14. A coolant system for an internal combustion engine of a motor vehicle, comprising:
a tank configured to provide a liquid coolant;
an injection valve configured to inject the coolant into a combustion chamber or an intake pipe of the internal combustion engine; and
a coolant delivery device configured to deliver the coolant from the tank to the injection valve, the coolant delivery device including:
a pump configured to deliver the coolant, the pump including:
a suction port connected to the tank; and
a pressure port configured assigned to the internal combustion engine for the coolant;
an activatable electric motor configured to drive the pump;
a shut-off valve assigned to the suction port;
a return line connected to the tank, the return line including at least one check valve;
a heating device; and
a common module housing;
wherein, to form the coolant delivery device, at least the pump, the electric motor, the shut-off valve, the at least one check valve, and the heating device together form a delivery module and are positioned in the common module housing.

15. An internal combustion engine for a motor vehicle, comprising:
a coolant system including:
a tank configured to provide a liquid coolant;
an injection valve configured to inject the coolant into a combustion chamber or an intake pipe of the internal combustion engine; and
a coolant delivery device configured to deliver the coolant from the tank to the injection valve, the coolant delivery device having:
a pump configured to deliver the coolant, the pump including:
a suction port connected to the tank; and
a pressure port configured assigned to the internal combustion engine for the coolant;
an activatable electric motor configured to drive the pump;
a shut-off valve assigned to the suction port;
a return line connected to the tank, the return line including at least one check valve;
a heating device; and
a common module housing;
wherein, to form the coolant delivery device, at least the pump, the electric motor, the shut-off valve, the at least one check valve, and the heating device together form a delivery module and are positioned in the common module housing.

* * * * *